UNITED STATES PATENT OFFICE.

JACOB KLEIN, OF NEW YORK, N. Y.

MATCH-HEADING COMPOSITION.

SPECIFICATION forming part of Letters Patent No. 485,103, dated October 25, 1892.

Application filed April 30, 1892. Serial No. 431,348. (No specimens.)

*To all whom it may concern:*

Be it known that I, JACOB KLEIN, a citizen of the United States, residing at New York, in the county of New York and State of New York, have invented certain new and useful Improvements in Matches; and I do hereby declare the following to be a full, clear, and exact description of the invention, such as will enable others skilled in the art to which it appertains to make and use the same.

My invention has relation to improvements in matches; and it has for its general object to provide a match embodying such a chemical constituency that while it may be ignited when subject to a minimum amount of friction, yet it will burn slowly and will be difficult to extinguish until the stick is consumed.

To the attainment of the foregoing object the invention consists of a match-stick treated as hereinafter described and headed with a compound formed by the following ingredients, combined in substantially the proportions stated, viz: dextrine, twenty pounds; water, eleven pounds six and a half ounces; phosphorus, six pounds ten ounces; minium, fifty-four pounds; lamp-black, two pounds. Then add one quart of water and twenty-six pounds of pure nitric acid, preferably 40° Baumé, and, after mixing thoroughly, one hundred and twenty quarts warm water and seventy-two pounds nitric acid.

Although in the practice of my invention I prefer to employ match-sticks formed by providing a strip of pasteboard or other material with a series of lines of perforations, whereby a number of matches may be headed and treated at once, yet I do not desire to be confined to the same, as the match-sticks may be headed and treated individually, if desired.

In carrying out my invention I first sprinkle or otherwise saturate the match-sticks with aqueous solution of nitrate of potash, which serves to insure a slow and effective combustion of the stick, so that it will be difficult to extinguish. After the match-sticks have been thus treated they are headed by dipping their ends in the compound formed by the ingredients before specified, after which they are allowed to dry and are then ready for use.

It will be found in practice that a small portion of the compound formed by the ingredients specified upon the end of a match-stick will readily induce combustion on the application of a minimum amount of friction, and I therefore prefer to place but a slight amount of the compound on each match-stick.

Having thus described my invention, what I claim, and desire to secure by Letters Patent, is—

A compound for heading matches, consisting of dextrine, water, phosphorus, minium, lamp-black, and nitric acid combined in about the proportions stated.

In testimony whereof I affix my signature in presence of two witnesses.

JACOB KLEIN.

Witnesses:
MORRIS LUKOR,
MAURICE B. BLUMENTHAL.